US006778825B2

(12) United States Patent
Parkman

(10) Patent No.: US 6,778,825 B2
(45) Date of Patent: Aug. 17, 2004

(54) PATH DISCOVERY METHOD FOR RETURN LINK COMMUNICATIONS BETWEEN A MOBILE PLATFORM AND A BASE STATION

(75) Inventor: David S. Parkman, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 521 days.

(21) Appl. No.: 09/851,057

(22) Filed: May 8, 2001

(65) Prior Publication Data
US 2002/0168971 A1 Nov. 14, 2002

(51) Int. Cl.[7] .................................................. H04B 1/40
(52) U.S. Cl. ...................... 455/427; 455/428; 455/12.1; 455/431; 370/229; 370/238
(58) Field of Search ................................. 455/427, 428, 455/429, 430, 12.1, 13.1, 445, 11.1, 15, 22, 88; 370/254, 255, 229, 238

(56) References Cited

U.S. PATENT DOCUMENTS

| 5,208,811 | A | * | 5/1993 | Kashio et al. ............... 370/401 |
| 5,530,909 | A | | 6/1996 | Simon et al. |
| 5,805,593 | A | * | 9/1998 | Busche ........................ 370/396 |
| 5,951,709 | A | * | 9/1999 | Tanaka ........................ 714/755 |
| 6,023,733 | A | * | 2/2000 | Periasamy et al. .......... 709/241 |
| 6,026,077 | A | * | 2/2000 | Iwata .......................... 370/254 |
| 6,052,560 | A | * | 4/2000 | Karabinis ................... 455/12.1 |
| 6,181,682 | B1 | * | 1/2001 | Abbadessa et al. ......... 370/328 |
| 6,201,794 | B1 | | 3/2001 | Stewart et al. |
| 6,275,470 | B1 | * | 8/2001 | Ricciulli ...................... 370/238 |
| 6,301,463 | B1 | * | 10/2001 | Dao et al. ...................... 455/39 |
| 6,324,405 | B1 | * | 11/2001 | Young et al. ............. 455/456.1 |
| 6,643,274 | B2 | * | 11/2003 | D'Annunzio ................ 370/316 |
| 2002/0027925 | A1 | * | 3/2002 | Barkai et al. ................ 370/408 |
| 2002/0058478 | A1 | * | 5/2002 | de La Chapelle et al. . 455/13.4 |
| 2002/0167917 | A1 | * | 11/2002 | Stephenson et al. ........ 370/319 |
| 2003/0117966 | A1 | * | 6/2003 | Chen .......................... 370/255 |
| 2003/0123481 | A1 | * | 7/2003 | Neale et al. ................. 370/466 |

FOREIGN PATENT DOCUMENTS

EP          0 837 568 A2    4/1998

OTHER PUBLICATIONS

International Search Report dated Jul. 5, 2002 for PCT/US 02/14456, 3 pages.

* cited by examiner

Primary Examiner—William Trost
Assistant Examiner—Marcos Torres
(74) Attorney, Agent, or Firm—Harness Dickey & Pierce P.L.C.

(57) ABSTRACT

A polling system and method for establishing forward and return communications links with a plurality of mobile platforms operating within a given coverage region. The system and method combines preliminary return channel information and path discovery information into polling messages transmitted by a ground station. A mobile platform responding to the polling messages relayed from one of a plurality of satellite based transponders transmits a response on the designated preliminary return channel and includes the path discovery information in its response. The path discovery information informs the ground station of the precise route through various components of the forward link communications path that the polling message took in reaching the mobile platform. Combining the path discovery information and the return channel information into the forward link polling messages saves important transponder bandwidth.

9 Claims, 7 Drawing Sheets

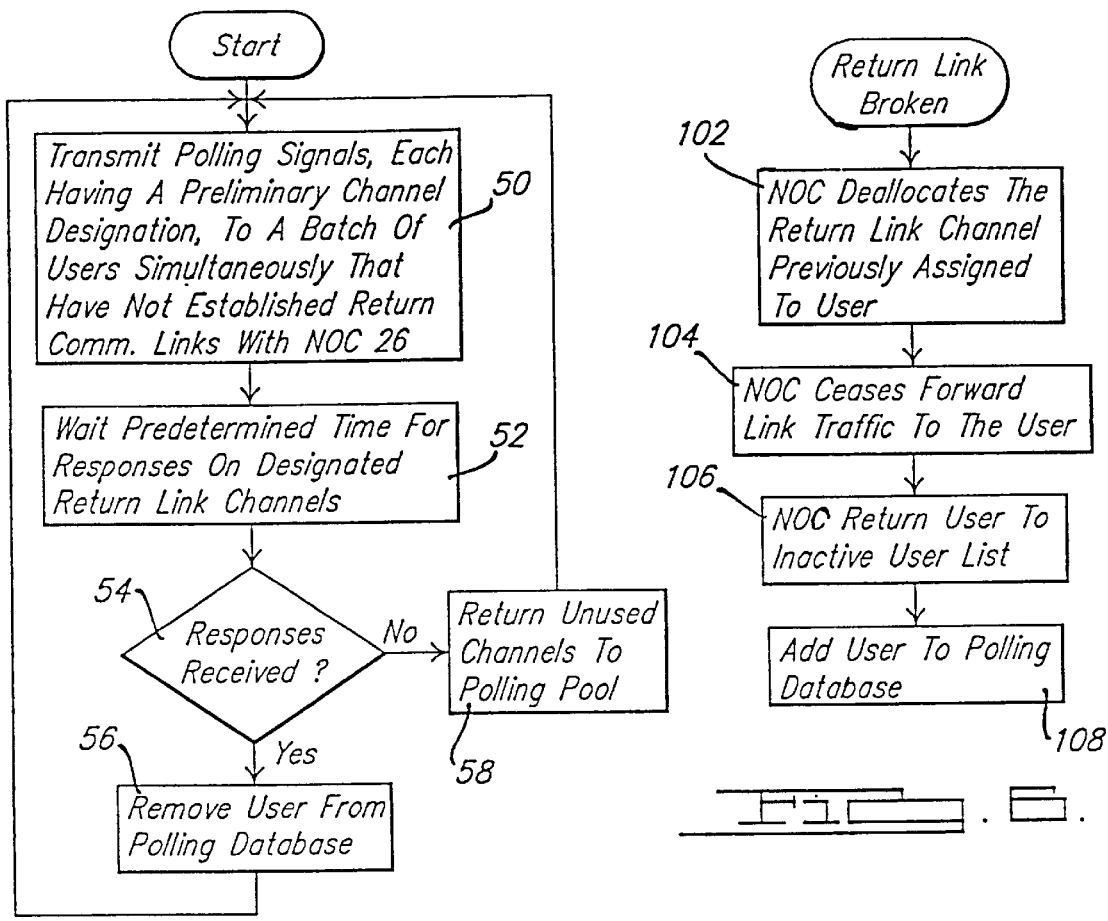
FIG. 3.
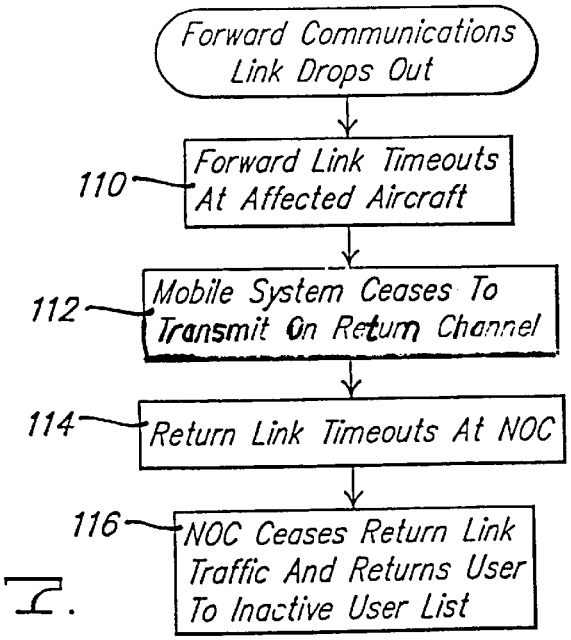
FIG. 6.
FIG. 7.

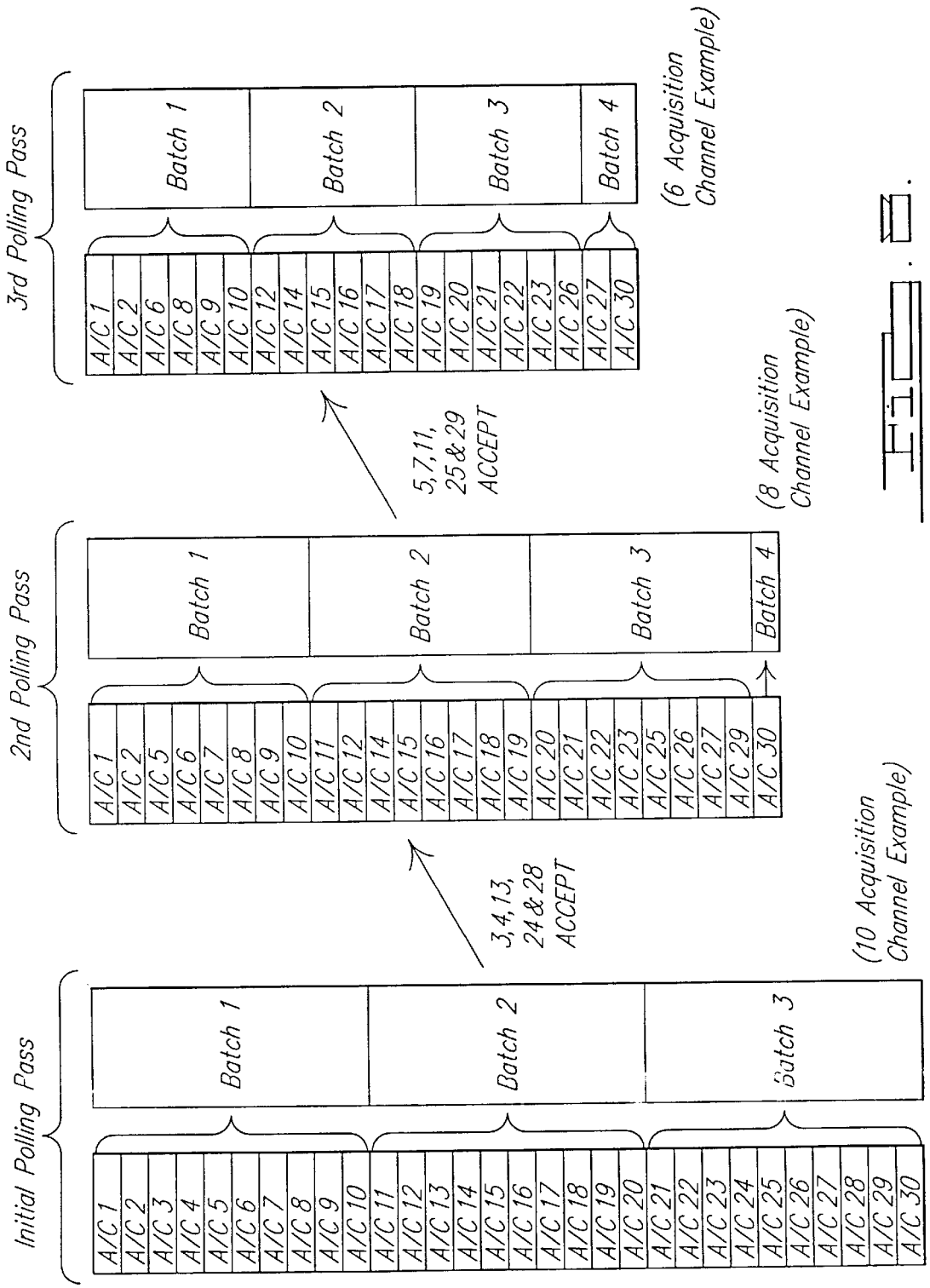

PATH DISCOVERY METHOD FOR RETURN LINK COMMUNICATIONS BETWEEN A MOBILE PLATFORM AND A BASE STATION

FIELD OF THE INVENTION

The present invention relates to systems and methods for facilitating communications and data content transfer between a base station and a mobile platform via a satellite based transponder. More particularly, the present invention relates to such a system and method which provides routing information in a forward link signal to the mobile platform which the mobile platform returns to the base station in a return link signal, thereby informing the base station of the precise route through various components in the forward communications link path that the forward link signal took in reaching the mobile platform.

BACKGROUND OF THE INVENTION

Broadband data and video surfaces, on which our society and economy have grown to depend, have heretofore generally not been readily available to users on board mobile platforms such as aircraft, ships, trains, automobiles, etc. While the technology exists to deliver such services to all forms of mobile platforms, past solutions have been generally quite expensive, low data rate and/or available to only very limited markets of government/military users and some high-end maritime markets (i.e., cruise ships).

At present, a wide variety of data services can be provided via a satellite link from a ground-based radio frequency transceiver. Such data services may include conventional Internet services such as email, web browsing, net meeting, as well as virtual private networks (VPNs) for corporate and government customers.

One particular problem with establishing communication links between numbers of mobile platforms operating within a given coverage region, and a single base station, for example a ground-based RF transceiver, is the difficulty in quickly establishing communications links with each of the mobile platforms. For example, with commercial air traffic dozens of aircraft may be moving into and out of a given coverage region throughout any given time period. In this situation, it is critical that each aircraft be able to quickly establish a communications link with the base station within the coverage region which it is traversing without interfering with communication links already established with the base station by other aircraft. It is also important that the bandwidth assigned to any given aircraft can be modified to accommodate, as best as possible, the bandwidth demands of each aircraft to handle the volume of data content being transmitted from the aircraft back to the ground station.

It is also important that any such system as described above which is intended to facilitate a return communications link for a mobile platform, such as an aircraft, needs to be able to quickly deduce that the aircraft is not responding to a polling signal and then to reallocate the specific return channel to other aircraft which may be requesting additional bandwidth to handle increased data rate transmission needs.

Another important consideration is the ability to maintain an accounting of which components a "forward link" signal passes through before it is received by a mobile platform while using the least amount of bandwidth in reporting this path. By "forward link" it is meant a signal that is transmitted from a base station, typically including a ground based RF transceiver, to the mobile platform. For any base station attempting to receive RF communications from a plurality of mobile platforms via a transponder, a number of independent components such as modulators and satellite based transponders may need to be employed. The system will also need to maintain an accounting of which modulators and transponders are being used by which mobile platform as the mobile platform transmits data or other information back to the base station. Normally, such information would require additional bandwidth as it would be transmitted back from the mobile platform in a separate message to the ground station. A transmission of data or other information from the mobile platform back to the base station can be termed a "return link" transmission. By knowing at all times which components in an equipment chain of the base station, as well as which satellite based transponders, are forming forward link communications paths with a mobile platform, the base station would be able to more efficiently manage forward link traffic and the use of its forward link components. If forward link path information could be combined with other information in the return link response by the aircraft, then valuable bandwidth could be conserved as well.

SUMMARY OF THE INVENTION

The present invention relates to a system and method for enabling a mobile platform communicating with a base station via a satellite based RF transponder to provide pertinent information to the base station as to a "path discovery" of a signal which it receives from the base station when a communications link is being established. By "path discovery" it is meant the specific components associated with the base station, as well as specific transponders (if more than one is available to form a communications link) which form a signal path to the mobile platform. Advantageously, this path discovery information is provided together with return channel information in a single polling signal so that an inactive mobile platform can be informed as to which one of a plurality of available return channels it should respond on, and can also provide important path discovery information back to the base station in its return link transmissions. Combining this path discovery information with the preliminary return channel information saves significant transponder bandwidth.

With the present invention, the path discovery information is provided in the body of forward link polling messages transmitted to the mobile platform via the satellite based transponder. The mobile platform, in its return link transmissions, includes this path discovery information. This informs the base station as to exactly which of its components have been used to form a communications link or links with the mobile platform. Since the base station will typically employ a plurality of components, such as RF modulators, and since it is anticipated that a plurality of satellite transponders may be employed to handle the return link traffic, it becomes important for the base station to know at all times exactly which of its components, as well as which transponders, are forming communications links with specific mobile platforms that have each established a return communication link with it. In this manner the base station is able to effectively manage its resources (i.e., components) to maintain a plurality of independent communications links with a corresponding plurality of mobile platforms. Just as importantly, combining the path discovery information with the polling signals and having the mobile platform transmit this information back to the base station with its response saves transponder bandwidth.

BRIEF DESCRIPTION OF THE DRAWINGS

The present invention will become more fully understood from the detailed description and the accompanying drawings, wherein:

FIG. 3 is a flowchart showing the steps of operation of the system and method in polling an inactive user;

FIG. 6 is a flowchart of the steps performed by the network operations center in the event a return communications link with a mobile platform is broken;

FIG. 7 is a flowchart of the steps performed by the network operations center (NOC) and an affected mobile platform when a forward communications link is lost;

FIG. 8 is an illustration of three polling passes showing how the batch size of the polling signals can vary depending upon the total number of mobile platforms being polled.

DETAILED DESCRIPTION OF THE PREFERRED EMBODIMENTS

The following description of the preferred embodiment is merely exemplary in nature and is in no way intended to limit the invention, its application, or uses.

Figure 1:
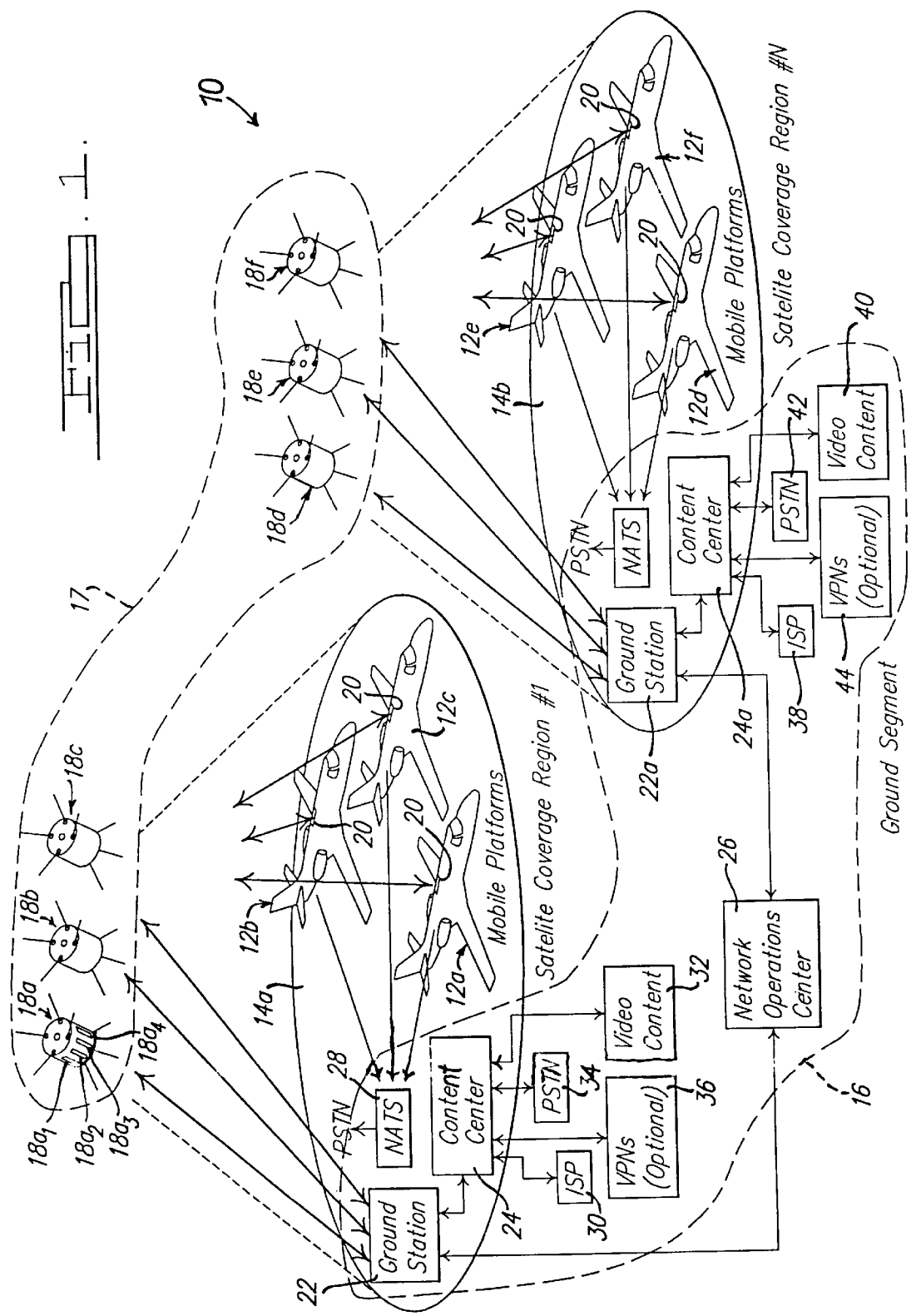
FIG. 1 is an illustration of the major components of a system which may be employed in implementing the polling system and method of the present invention.

Referring to FIG. 1, there is shown a system 10 in accordance with a preferred embodiment of the present invention. The system 10 is used to implement the polling method of the present invention to provide dedicated return communication channels to a plurality of mobile platforms operating within one or more predefined coverage regions. FIG. 1 illustrates the mobile platforms 12a–12f as aircraft, but it will be appreciated that cruise ships or any other moving vehicle could represent a mobile platform. As such, the illustration of the mobile platforms as aircraft in FIG. 1, and the reference to the mobile platforms 12 as aircraft throughout the following description, should not be construed as limiting the present invention to only aircraft.

The aircraft 12a–12f are also illustrated as operating within a pair of distinct coverage regions 14a and 14b. The system 10 generally comprises a ground segment 16, a plurality of satellites 18a–18f forming a space segment 17, and a mobile system 20 disposed on each moving platform 12. The mobile system 20 may consist of an RF transceiver, suitable transmit and receive antennas, and an antenna controller for enabling the antennas to be mechanically or electronically steered to track a designated satellite while the aircraft 12a–12c are traveling through the coverage region 14a.

The space segment 17 may include any number of satellites 18 in each coverage region 14a and 14b needed to provide coverage for the entire region. The satellites 18 preferably comprise Ku or Ka-band satellites. Each of the satellites 18 are further located in a geostationary orbit (GSO) or a non-geostationary orbit (NGSO). Examples of possible NGSO orbits that could be used include low Earth orbit (LEO), medium Earth orbit (MEO) and a highly elliptical orbit (HEO). Each of the satellites 18 includes at least one radio frequency (RF) transponder, and more preferably a plurality of RF transponders. For example, satellite 18a is illustrated as having four transponders 18a1–18a4. It will be appreciated that each other satellite 18 could have a greater or lesser plurality of RF transponders as required to handle the communications traffic anticipated from the aircraft 12 operating within the coverage areas 14a and 14b.

Ground station 22a comprises an antenna and an RF transceiver with associated antenna control electronics needed for transmitting data content to the satellites 18. The antenna of the ground station 22a is also used to receive data content transponded by the transponders of each satellite 18 within the coverage region 14a. Ground station 22a may be located anywhere within the coverage region 14a. Similarly, ground station 22b, if incorporated, can be located anywhere within the second coverage region 14b.

A content center 24 may be in communication with a variety of external content providers and controls the transmission of video and data information received by it to the ground station 22a. The content center 24 is preferably in contact with an Internet service provider (ISP) 30. Optionally, a video content source 32, a public switched telephone network (PSTN) 34, and/or one or more virtual private networks (VPNs) 36 may also be in contact with the content center 24. The ISP 30 may be used to provide Internet access to each of the occupants of the aircraft 12. The video content source 32 may be used to provide live television programming to the occupants of the aircraft 12. A network operations center (NOC) 26 maintains databases of what return link channels are presently in use, as well as what return link channels are available for use by the aircraft 12. The NOC 26 also performs traditional network management, user authentication, customer service and billing tasks. The content center 24a associated with the ground station 22b in the second coverage region 14b would also preferably be in communication with an ISP 38, and optionally also with one or more of a video content provider 40, a PSTN 42 and a VPN 44.

Figure 2:
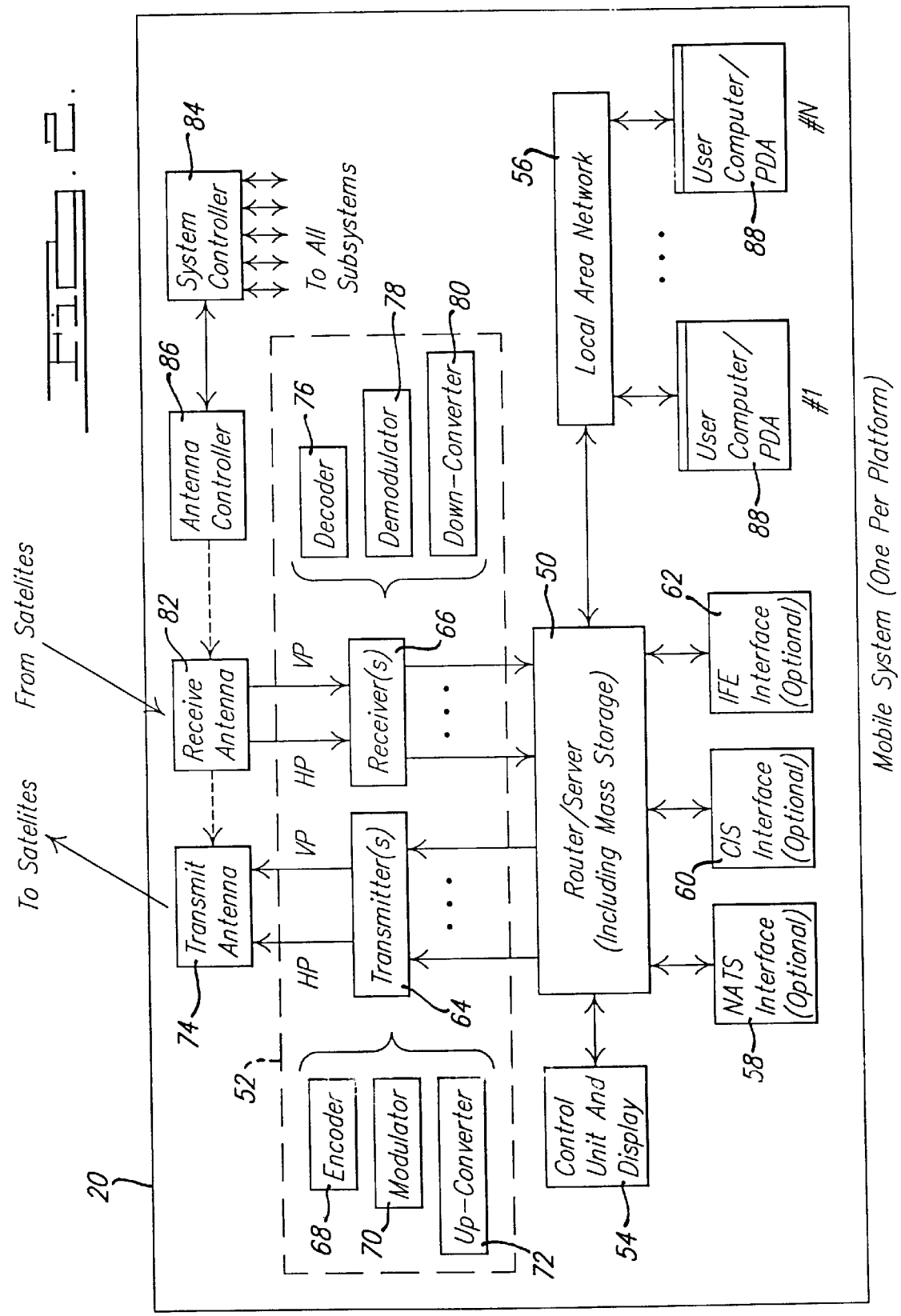
FIG. 2 is a simplified illustration of a plurality of mobile platforms, in this instance illustrated as aircraft, being polled by a base station, and where several of the aircraft are responding to the polling signals on assigned, dedicated return communication channels while other aircraft ignore the polling signals and remain inactive.

Turning now to FIG. 2, the operation of the polling system of the present invention in establishing return communication links rapidly and in an orderly fashion with a plurality of aircraft operating within the coverage region 14a will be described. Although this description will focus on only coverage region 14a, it will be appreciated that the system 10 and method of the present invention will preferably be implemented in each distinct coverage region which the aircraft 12 is required to operate within. Furthermore, for simplicity, only satellite 18a has been illustrated as orbiting within the coverage region 14a.

The NOC 26 is provided with a list of "registered" users (i.e., aircraft 12) for which an account has been established. When an aircraft 12 is registered, some form of identification number associated with that particular aircraft is maintained by the NOC 26 in a polling database of authorized users (i.e., aircraft that have an account established with the NOC 26). The identification number may comprise an "ICAO" (International Communication Avionics Organization) number or any form of designation which uniquely identifies the aircraft 12. In addition, each aircraft 12 may be further designated as being "active" or "inactive". An active aircraft is one that currently has a return communications link established with the ground station 22a. An "inactive" aircraft is one that is authorized to use the system 10 (i.e., its ID code is maintained in the NOC's 26 polling database) but which has not established a return communications link with the ground station 22a. An aircraft 12 which needs to be removed from service for temporary or extended maintenance may be reported to the NOC 26, by the airline operating that particular aircraft, that that aircraft has been temporarily removed from service. Such an aircraft can then be removed from the NOC's polling database. The NOC 26 maintains a separate database of all aircraft 12 having "inactive" status. Thus, only aircraft 12 having "active" status are maintained in the polling database of the NOC 26.

For purposes of simplicity, a single satellite 18a having a forward link transponder $18a_1$ and a return link transponder $18a_2$ is shown in FIG. 2. The term "forward link" is used to denote all transmissions of data content from the ground station $22_a$ to the aircraft 12 via the forward link transponder $18a_1$. The term "return link" is used to denote all transmissions of data content from the aircraft 12 to the ground station $22_a$ via the return link transponder $18a_2$. The return link transponder $18a_2$ is effectively subdivided into a plurality of narrow band "slots" or channels via code division multiple access (CDMA) techniques, or alternatively via frequency division multiple access (FDMA), time division multiple access (TDMA) or any other multiple access scheme. Still further schemes are disclosed in U.S. Pat. No. 5,103,459 to Gilhousen et al, the disclosure of which is hereby incorporated by reference into the present application. Each narrowband channel comprises a predetermined bandwidth, for example, 16 Kbps. However, it will be appreciated that a larger or smaller bandwidth channel could be incorporated.

Referring now to FIGS. 2 and 3, the polling system and method of the present invention will be described. It is a principal advantage of the present invention that multicast forward link polling messages are transmitted from the ground station 22a via the forward link transponder $18a_1$ to a group or "batch" of the inactive users in the NOC's 26 inactive user polling database simultaneously. A polling batch may include a number of aircraft be larger or smaller than 12, depending on available transponder resources (e.g. available return channels).

It is a further advantage that the multicast polling messages each carry several items of important information, namely, the ID code of the aircraft for which the message is intended, information as to which satellite should be tracked, the frequency of the return link transponder $18a_1$ assigned to the aircraft, and the CDMA or other multiple access code to be used by the mobile system 20 of the aircraft for communications with the ground station 22a. The specific satellite, return link transponder, transponder frequency and CDMA code (or other multiple access code) can collectively be viewed as the preliminary "return channel." The multicast polling signals are transmitted to all aircraft 12 that have not already established return communications links with the ground station 22a, as indicated at step 50 in FIG. 3, and as indicated by forward link signals 51 in FIG. 2 through a series of batch polls. In this regard, the operators of each aircraft 12 in each batch poll will be advised of the frequency on which the polling messages will be transmitted, and this frequency will be known to all registered users. All aircraft 12 operating under inactive status receive all of the polling messages and the mobile system 20 of the aircraft determines which polling message is directed to it. This is accomplished by having the mobile system 20 of each aircraft 12 look for the ID code of its aircraft 12 in all of the multicast polling batch messages it receives.

The NOC 26 then waits for a predetermined time period, for example 5 seconds, for responses to be received via the return link transponder $18a_2$ on the preliminary return channels, as indicated at step 52 in FIG. 3. These return link responses are indicated by arrows 53 in FIG. 2. At the end of the polling period, a determination is made as to which preliminary return channels the NOC 26 has received responses on, as indicated in step 54. Those preliminary return channels on which the NOC 26 has received a response from an aircraft 12 are then removed from the NOC's database of available preliminary return channels maintained by the NOC, and the particular aircraft that has responded on the preliminary return channel is also removed from the NOC's inactive user polling database, as indicated at step 56. Those aircraft 12 that have not responded on their preliminary return channels are maintained in the NOC's 26 inactive user polling database and the unused preliminary return channels are added to the NOC's database of available CDMA (or other multiple access) return channels, as indicated at step 58. The process then repeats within a short time, for example 5 seconds, with the NOC 26 again transmitting a batch of multicast polling messages via the forward link transponder $18a_1$ to the next set of aircraft 12 listed in its inactive user polling database with preliminary return channel information accompanying each of the polling messages. This process continues until all inactive aircraft 12 have been included in a batch of polling messages. Then the cycle begins again for the revised list of inactive aircraft.

It is a principal advantage of the polling system and method of the present invention that "batches" of aircraft 12 are polled simultaneously and provided with preliminary return channel designations, using batch sizes as large as possible, rather than polling each aircraft individually and waiting for a response. By polling all aircraft 12 simultaneously in batches and providing preliminary return channels on which each aircraft in the batch can respond immediately, numbers of aircraft can be allowed to establish return communications links with the ground station 22a in a very rapid, orderly fashion.

Figure 4:
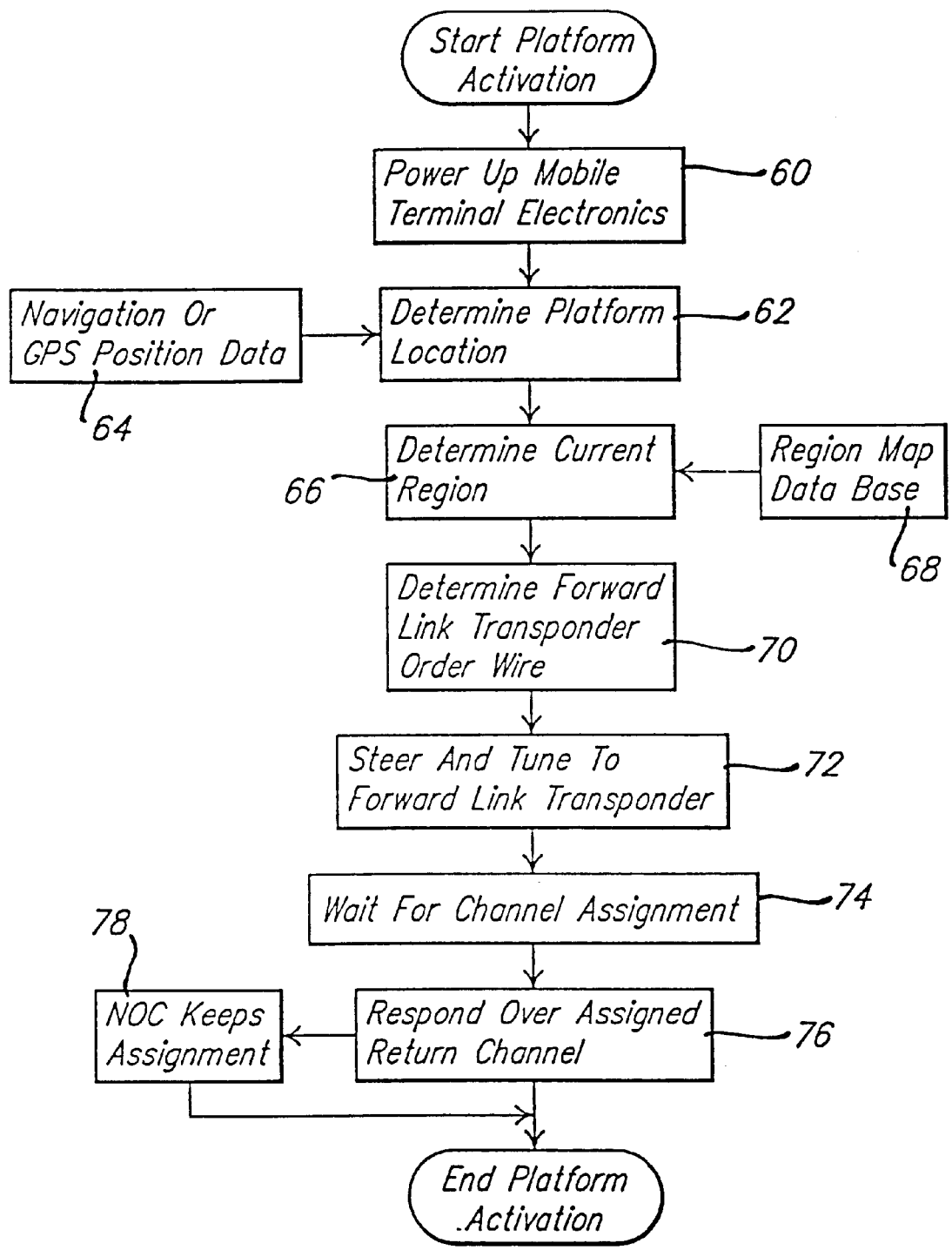
FIG. 4 is a flowchart of a platform activation process that a mobile platform goes through in preparing to establish a communications link with a ground station.

Turning now to FIG. 4, a more detailed description of the process that each aircraft 12 goes through in establishing a return communications link with the NOC 26 will be provided. Any aircraft 12 entering or operating within the coverage region 14a must first power up its mobile system 20, as indicated at step 60. The mobile system 20 must next determine the location of its associated aircraft 12 within the coverage region 14a, as indicated at step 62. This is accomplished with the aid of position data from the aircraft's 12 navigation system or global positioning system (GPS) as indicated by block 64. If more than one coverage region 14a exists, then the mobile system 20 also determines the coverage region that it is presently operating within, as indicated at step 66. This can be accomplished via a "region map" database maintained by the mobile system 20, as indicated by block 68.

Referring further to FIG. 4, the mobile system 20 next determines the forward link transponder to which it needs to tune, as indicated at step 70. The mobile system 20 then steers its receive antenna toward the forward link transponder $18a_1$ and tunes to a known frequency on which this transponder is operating, as indicated at step 72. The mobile system 20 then waits and listens for the multicast polling signals from the forward link transponder $18a_1$ which includes the aircraft's 12 preliminary return channel assignment, as indicated at step 74. Once the aircraft 12 receives the polling signal with its ID code together with its preliminary return channel assignment, the aircraft 12 responds on the assigned preliminary return channel, as indicated at step 76. The NOC 26 then removes the preliminary return channel from its database of available preliminary return channels, as indicated at step 78, and the platform activation process is complete.

Figure 5:
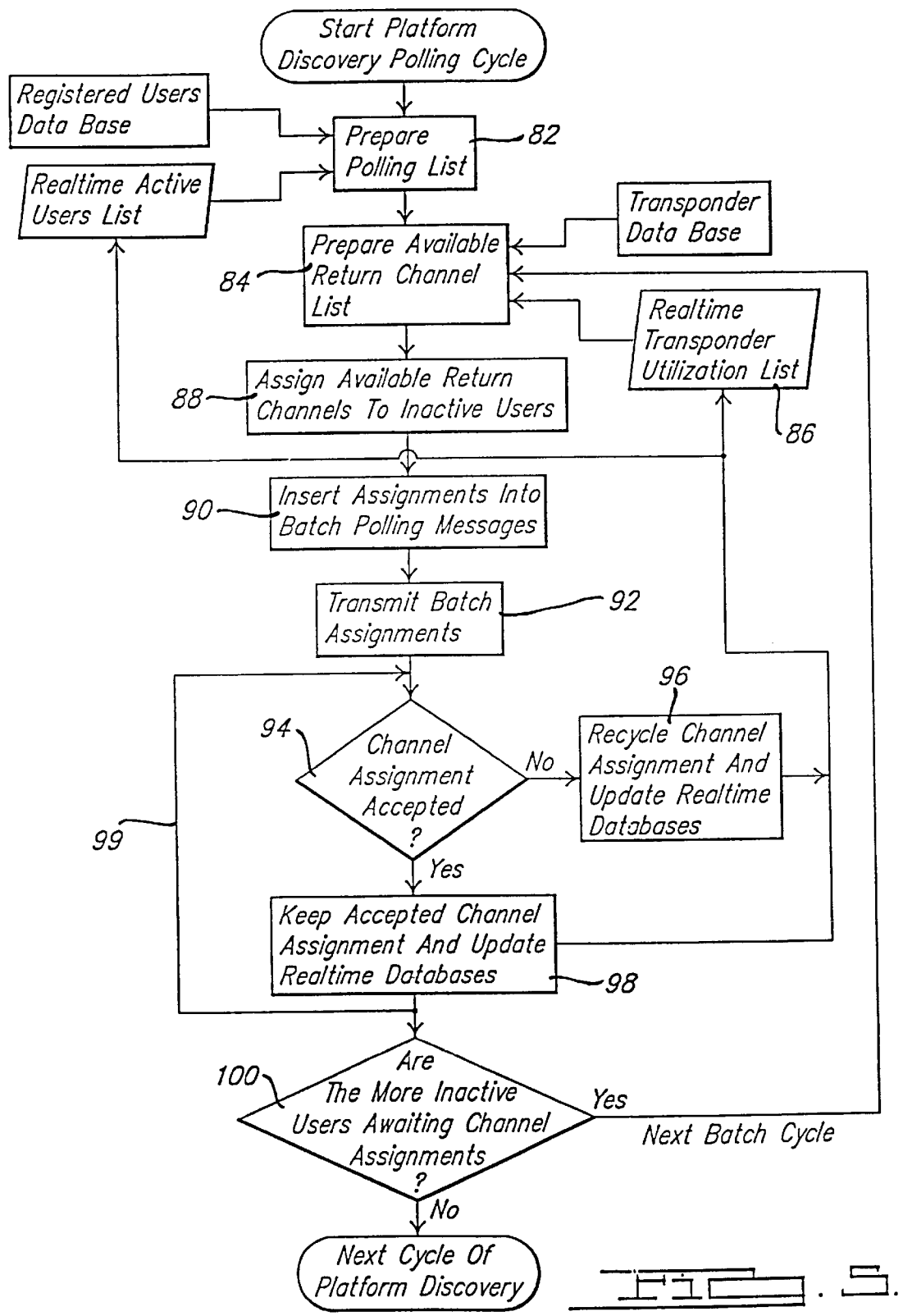
FIG. 5 is a more detailed flowchart of the steps performed in polling a mobile system.

Referring now to FIG. 5, a more detailed description of the process by which the NOC 26 establishes a return communications link with a given aircraft 12 will be provided. The NOC 26 continuously prepares/updates its inactive user polling database by removing those aircraft 12 that establish return communications links from its database of inactive users, as indicated at step 82. From its polling list, the NOC 26 creates a list of available preliminary return channels, as indicated at step 84. The NOC 26 creates this list of available preliminary return channels by subtracting currently used channel assignments from a real time transponder utilization list, indicated at step 86. The real time transponder utilization list represents a list of those transponder channels presently being used at a given time. The NOC 26 also maintains a transponder database of all return link transponder channels available when preparing the available preliminary return channel list.

With further reference to FIG. 5, the NOC 26 then assigns available return channels to as many inactive users in its inactive user polling database that the next batch can accommodate, as indicated at step 88. The NOC 26 then inserts the preliminary return channel assignments into a message body of each forward link polling message, as indicated at step 90. The channel assignments are then transmitted over the forward link transponder 18a1 as a single "batch" of multicast messages, as indicated at step 92. The NOC 26 then waits a predetermined time period, for example, 5 seconds, and makes a determination as to which return channel assignments have been accepted by previously inactive users, as indicated at step 94. Those channel assignments that have not been accepted are then added back to the real time database of available preliminary return channels, as indicated at step 96, and used by the NOC 26 in subsequent polling. The NOC 26 then updates its real time database of active users to include those users (i.e., aircraft 12) that have responded on their assigned preliminary return channels, as indicated at step 98. The NOC 26 then checks its inactive user database to determine if there are additional inactive users awaiting preliminary return channel assignments, as indicated at step 100 and, if so, creates another batch polling message for the next set of inactive users. If there are no additional inactive users awaiting channel assignments in this pass, then the NOC 26 begins a new cycle of platform discovery by starting over with the polling of an updated inactive user list.

It is also an important feature of the system 10 and method of the present invention that each active user is allowed to request additional bandwidth to meet its bandwidth needs. Accordingly, after responding on the preliminary return channel assigned to it by the NOC 26, a given aircraft 12 may request an additional channel or "slot" and, if approved by the NOC 26, the mobile system 20 will be given a larger bandwidth slot, for example, 64 Kbs, on which to conduct return link communications. The mobile system 20 releases the additional bandwidth channel when it is no longer needed and this channel is added back into the NOC's 26 real time database of available return channels.

Referring to FIG. 6, in the event that the return communications link with any aircraft 12 is broken, then the NOC 26 reallocates the return link channel previously assigned to that aircraft, as indicated at step 102. The NOC 26 then ceases forward link traffic to the user, as indicated at step 104 and then returns the user to the inactive user list, as indicated at step 106. The NOC 26 will then add the user to the polling database, as indicated at step 108. During the next polling sequence by the NOC 26, the NOC will provide a new preliminary return channel assignment with the polling message addressed to the affected aircraft 12.

With brief reference to FIG. 7, if the forward communications link should drop out for any reason, then the forward link will time out at the mobile system 20 of the affected aircraft 12, as indicated at step 110. The mobile system then ceases to transmit on the assigned return channel, as indicated at step 112, and the assigned return link then times out at the NOC 26, as indicated at step 114. The NOC 26 then ceases return link communications and returns the user to the inactive user list, as indicated at step 116. Thereafter, the NOC 26 will attempt to establish a communication link with the affected aircraft 12 by transmitting a new preliminary return channel assignment in the body of the polling signal directed to the aircraft.

In the event more than one distinct coverage region is employed, the NOC 26 coordinates a handoff of the forward and return communications links with the aircraft while the aircraft is traveling through a designated overlap between the two regions. This process is described in detail in co-pending U.S. application Ser. No. 09/851.369 filed concurrently herewith.

With reference to FIG. 8, it can be seen how the size of the batches of polling messages is varied as aircraft (denoted by "a/c" in FIG. 8) respond to the batch polling messages. During an initial polling pass three batches of polling messages, each directed to 10 different aircraft 12, are transmitted. Aircraft numbers 3, 4, 13, 24, and 28 accept (i.e., respond) to their polling messages. The second polling pass involves polling only those aircraft 12 that did not respond to their respective polling message in the initial polling pass. It will be noted that the batches are limited to eight aircraft 12 per batch in the second polling pass with four batches rather than three.

In the second polling pass aircraft 5, 7, 11, 25 and 29 respond to their polling messages. Thus, in the third polling pass these aircraft 12 are removed from the NOC's 26 polling list. The batch size is further reduced to a maximum of six aircraft 12, with only those aircraft that have not responded to a previous polling message being polled.

The polling system and method of the present invention thus provides a means for establishing return communications links with groups of mobile platforms traveling within a given coverage region in a quick, orderly manner. The system and method of the present invention does not require the network operations center controlling the establishment of return communications links with numbers of mobile platforms to wait for one user at a time to acknowledge a polling message before polling other users. This facilitates establishing communication links in a much more expeditious and orderly manner than previously developed polling systems and methods.

Another important aspect of the present invention is the combining of "path discovery" information with the response the aircraft 12 makes on the preliminary return channel when it responds to a polling message. This feature will be discussed in connection with FIG. 9, which illustrates the various pluralities of components of the ground segment 16 and the space segment 17 which can be used to establish a plurality of independent return links from a plurality of aircraft 12.

Figure 9:
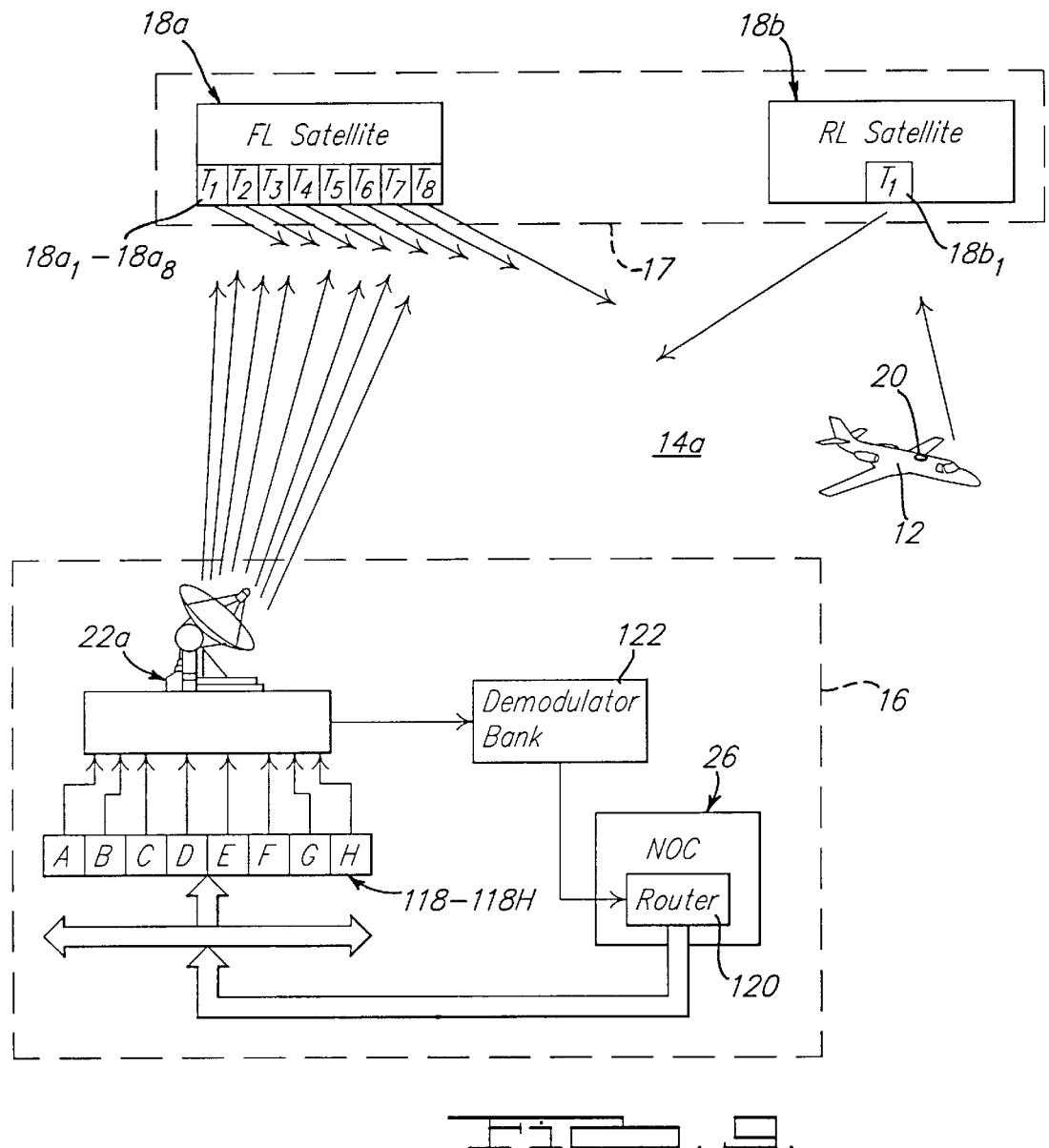
FIG. 9 is a simplified block diagram of a ground segment and a space based segment, and further illustrating a return link communication which includes important path discovery information.

In FIG. 9, the ground segment 16 can be seen to include a modulator bank 118 comprised of eight RF modulators 118A–118H which are fed digital signals from a router 120. The router 120 is in communication with the NOC 26. The satellite 18a is shown as including eight independent forward link transponders $18a_1$–$18a_8$. Each of the eight transponders $18a_1$–$18a_8$ operates at a different frequency. For simplicity, satellite 18b includes only a single return link transponder $18b_1$. It will be appreciated, however, that the precise plurality of forward link modulators 118 could vary significantly, and the illustration of eight such modulators is merely meant to exemplify that several of such components may be included in the ground segment 16. Similarly, the illustration of eight transponders $18a_1$–$18a_8$ is intended merely to exemplify that a plurality of such transponders may be employed in the system 10 of the present invention.

The RF modulator bank 118 generates a plurality of RF polling messages from digital information supplied by the router 120. This information comprises the return channel information discussed earlier herein. When this information passes through each modulator 118a–118f, additional information identifying the specific modulator which generated the signal is embedded therein, and each resulting forward link RF signal is transmitted to an associated one of the transponders $18a_1$–$18a_8$ together with the preliminary return channel information. The transponders $18a_1$–$18a_8$ relay the polling messages to all aircraft 12 operating within the coverage region 14a that have not yet established return communications links with the ground station 22a. When each transponder $18a_1$–$18a_8$ relays the polling message it also embeds identifying information in the forward link signal that identifies it as the particular transponder for the aircraft 12.

The mobile system 20 of a particular aircraft 12 receives the polling messages and determines which polling message is addressed to it. When it discerns this, it will use the designated preliminary return channel for its response, and its response will also include the information identifying exactly which forward link modulator 18a–18h and which forward link transponder $18a_1$–$18a_8$ generated that particular polling message. This information is the "path discovery" information identifying those specific components of the ground segment 16 and the space segment 17 which the polling message was routed through. Although not shown, the path discovery information could also include which ones of specific routers that a given polling message has passed through, as well as other components making up the signal path that polling message has taken in its transmission to the aircraft 12.

Once the mobile system 20 on board the aircraft 12 receives the polling message it then transmits a response to the return link transponder $18b_1$. This response includes the path discovery information supplied in the polling message. When the ground station 22a receives this response it forwards it to a demodulator bank 122 that demodulates the received signal and forwards the demodulated signal to the NOC 26. The NOC 26 can then readily determine, from the path discovery information included in the response, the components that the polling message passed through, and therefore the precise path of the communications link between the ground station 22a and the aircraft 12. Importantly, combining the path discovery information in the return link response conserves valuable transponder bandwidth.

Those skilled in the art can now appreciate from the foregoing description that the broad teachings of the present invention can be implemented in a variety of forms. It will also be appreciated that the variations of the preferred embodiments in specific embodiments herein could readily be implemented in other ones of the embodiments. Therefore, while this invention has been described in connection with particular examples thereof, the true scope of the invention should not be so limited since other modifications will become apparent to the skilled practitioner upon a study of the drawings, specification and following claims.

What is claimed is:

1. A method for establishing a radio frequency (RF) return communications link from a mobile platform having an RF transceiver to a base station having an RF transceiver, via at least one space based RF transponder, and wherein an operations center coordinates the transmission of RF messages from said base station to said mobile platform, the method comprising the steps of:

a) transmitting a message to said mobile platform from said base station via said space based RF transponder, said message including information relating to a transmission path discovery through specific components associated with said operations center;

b) using a plurality of forward link modulators associated with said operations center to transmit a plurality of said messages;

c) causing said RF transceiver of said mobile platform to receive said message; and d) causing said RF transceiver of said mobile platform to transmit a response to said base station via said space based RF transponder which includes said transmission path discovery information, thereby informing said ground station of the precise route through said specific components that said message took in passing from said operations center to said mobile platform.

2. The method of claim 1, further comprising the step of:

placing said discovery path information in a message body of said message.

3. The method of claim 1, further comprising the step of:

including information in said transmission path discovery information of each said message as to specify which one of said forward link modulators generated said message.

4. A method for establishing a radio frequency (RF) return communications link from a mobile platform having an RF transceiver to a base station having an RF transceiver, via at least one space based RF transponder, and wherein an operations center coordinates the transmission of RF messages from said base station to said mobile platform, the method comprising the steps of:

a) transmitting a message to said mobile platform from said base station via said space based RF transponder, said message including a message body, said message body including information relating to a transmission path discovery through specific components of at least one of said operations center or said space based RF transponder;

b) providing that said specific components include a plurality of independent forward link modulators associated with said operations center, for transmitting a plurality of said messages therefrom;

c) causing said RF transceiver of said mobile platform to receive said message; and d) causing said RF transceiver of said mobile platform to transmit a response to said base station via said space based RF transponder which includes said transmission path discovery information, thereby informing said ground station of the precise route through said specific components of at least one of said operations center components or said space based RF transponder, that said message took in reaching said mobile platform.

5. The method of claim 4, further comprising the step of:
including information in said path discovery information associated with each said message transmitted from said ground station, as to specifically which one of said forward link modulators generated a specific one of said messages received by said RF transceiver of said mobile platform.

6. The method of claim 4, further comprising the step of:
a) providing that said RF transceiver of said mobile platform includes a plurality of channels for receiving RF messages; and
b) causing said RF transceiver of said mobile platform to include in said response information identifying exactly which said channel said path discovery information was received on.

7. A method for establishing a radio frequency (RF) return communications link from a mobile platform having an RF transceiver to a base station having an RF transceiver, via at least one of a plurality of space based RF transponders, and wherein an operations center having a plurality of independent forward link modulators coordinates the transmission of RF messages from said base station to said mobile platform, the method comprising the steps of:
a) transmitting a message to said mobile platform from said base station via said space based RF transponder, said message including a message body, said message body including information relating to a transmission path discovery, wherein said transmission path discovery information includes which specific one of said forward link transponders and which specific one of said space based RF transponders said message was routed through while being transmitted to said mobile platform;
b) causing said RF transceiver of said mobile platform to receive said message; and
c) causing said RF transceiver of said mobile platform to transmit a response to said base station via said space based transponder which includes said transmission path discovery information, thereby informing said ground station of the precise route of said message in reaching said mobile platform.

8. The method of claim 7, further comprising the step of:
a) providing said RF transceiver of said mobile platform with a plurality of independent receiving channels; and
b) causing said transceiver of said mobile platform to include in its said response information as to which one of its said channels said message was received on.

9. A method for establishing a radio frequency return communications link from a mobile platform having an transceiver to a base station having an transceiver including a plurality of independent receiving channels, via at least one of a plurality of space based transponders, and wherein an operations center having a plurality of independent forward link modulators coordinates the transmission of messages from said base station to said mobile platform, the method comprising the steps of:
a) transmitting a plurality of messages to said mobile platform from said base station via said space based transponder, each said message including a message body, said message body including information relating to a transmission path discovery of its associated said message, wherein said transmission path discovery information includes which specific one of said forward link transponders and which specific one of said space based transponders said message was routed through while being transmitted to said mobile platform;
b) causing said R transceiver of said mobile platform to receive at least one of said messages;
c) causing said transceiver of said mobile platform to transmit a response to said base station via said space based transponder which includes said transmission path discovery information associated with said message which it received, thereby informing said ground station of the precise route of said received message in reaching said mobile platform; and
d) further including in said response information identifying specifically which one of said channels of said transceiver of said mobile platform said received message was received on.

* * * * *